(12) United States Patent
Mori (10) Patent No.: US 12,275,457 B2
(45) Date of Patent: Apr. 15, 2025

(54) VEHICLE STRUCTURAL MEMBER AND METHOD FOR MANUFACTURING SAME

(71) Applicant: KOBE STEEL, LTD., Hyogo (JP)

(72) Inventor: Yoshimune Mori, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 17/907,093

(22) PCT Filed: Mar. 4, 2021

(86) PCT No.: PCT/JP2021/008406
§ 371 (c)(1),
(2) Date: Sep. 22, 2022

(87) PCT Pub. No.: WO2021/210285
PCT Pub. Date: Oct. 21, 2021

(65) Prior Publication Data
US 2024/0217589 A1    Jul. 4, 2024

(30) Foreign Application Priority Data
Apr. 14, 2020   (JP) .................... 2020-072461

(51) Int. Cl.
*B21D 39/06* (2006.01)
*B21D 39/20* (2006.01)
(Continued)

(52) U.S. Cl.
CPC ........... *B62D 25/145* (2013.01); *B21D 39/06* (2013.01); *B21D 39/206* (2013.01);
(Continued)

(58) Field of Classification Search
CPC .... B21D 39/06; B21D 39/063; B21D 39/206; B21D 53/08; Y10T 29/4987; Y10T 29/4994; Y10T 29/49938
See application file for complete search history.

(56) References Cited

U.S. PATENT DOCUMENTS 3,071,399 A  *  1/1963  Cronin ................. F16B 17/004
                                                   29/523
3,345,730 A  *  10/1967  Laverty ................. B21D 39/06
                                                   29/523
(Continued)

FOREIGN PATENT DOCUMENTS

DE    2714757 A1  *  10/1977  ............. B21D 39/06
EP    0916855 A1     5/1999
(Continued)

OTHER PUBLICATIONS

International Search Report issued in PCT/JP2021/008406; mailed Apr. 27, 2021.
(Continued)

*Primary Examiner* — Jermie E Cozart
(74) *Attorney, Agent, or Firm* — Studebaker Brackett PLLC (57) ABSTRACT

A vehicle structural member 1 includes a tube body having an expanded tube portion that is partially expanded, and a wall surface body having a first wall provided with a first through-hole, a second wall provided with a second through-hole, and a connecting wall connecting the first wall and the second wall. The tube body is inserted through the first through-hole and the second through-hole, and is joined to the wall surface body by being pressure welded to the first through-hole and the second through-hole. The expanded tube portion is provided only between the first wall and the second wall.

3 Claims, 8 Drawing Sheets

(51) Int. Cl.
*B21D 53/88* (2006.01)
*B62D 25/14* (2006.01)

(52) U.S. Cl.
CPC ............ *B21D 39/063* (2013.01); *B21D 53/88* (2013.01); *Y10T 29/4987* (2015.01); *Y10T 29/49938* (2015.01); *Y10T 29/4994* (2015.01)

(56) References Cited

U.S. PATENT DOCUMENTS

| | | | | |
|---|---|---|---|---|
| 4,320,568 | A * | 3/1982 | Herrod | B21D 39/203 29/523 |
| 4,422,317 | A * | 12/1983 | Mueller | B21D 39/203 72/58 |
| 6,255,631 | B1 | 7/2001 | Kichline, Jr. et al. | |
| 2010/0038874 | A1 | 2/2010 | Varela et al. | |
| 2018/0272414 | A1 * | 9/2018 | Maeda | B60R 19/24 |

FOREIGN PATENT DOCUMENTS

| | | | | |
|---|---|---|---|---|
| EP | 2818610 | A1 | 12/2014 | |
| FR | 2814529 | A1 | 3/2002 | |
| GB | 2291368 | A | 1/1996 | |
| JP | S51-133170 | A | 11/1976 | |
| WO | WO-2017065231 | A1 * | 4/2017 | ............ B21D 39/03 |

OTHER PUBLICATIONS

Notification of Transmittal of Translation of the International Preliminary Report on Patentability and Translation of Written Opinion of the International Searching Authority; PCT/JP2021/008406; mailed on Oct. 27, 2022.

The extended European search report issued by the European Patent Office on Jun. 29, 2023, which corresponds to European Patent Application No. 21788735.5-1103 and is related to U.S. Appl. No. 17/907,093.

\* cited by examiner

VEHICLE STRUCTURAL MEMBER AND METHOD FOR MANUFACTURING SAME

CROSS-REFERENCE TO RELATED APPLICATIONS

This is a national phase application in the United States of International Patent Application No. PCT/JP2021/008406 with an international filing date of Mar. 4, 2021, which claims priority of Japanese Patent Application No. 2020-072461 filed on Apr. 14, 2020 the contents of which are incorporated herein by reference.

TECHNICAL FIELD

The present invention relates to a vehicle structural member and a method for manufacturing the same.

BACKGROUND ART

JP S51-133170 A discloses a method of coupling a tube body and a wall surface body provided with a through-hole. The method is a so-called rubber bulge coupling. Specifically, the tube body is inserted into the through-hole of the wall surface body, and an elastic body is inserted into the tube body. Then, by applying pressure so as to sandwich the elastic body, the tube body is expanded radially outwardly by the elastic body, and is pressed against an inner wall of the through-hole of the wall surface body.

SUMMARY OF THE INVENTION

In the rubber bulge coupling of JP S51-133170 A, there is a possibility that flexural rigidity and vibration damping properties of a coupled structural member deteriorate in an expanded tube portion. In particular, when the rubber bulge coupling is applied in the vehicle structural member, deterioration of the flexural rigidity and the vibration damping properties of the structural member can be a major problem.

An object of the present invention is to improve the flexural rigidity and the vibration damping properties of the expanded tube portion, in a vehicle structural member and a method for manufacturing the same.

A first aspect of the present invention provides a vehicle structural member including: a tube body having an expanded tube portion that is partially expanded; and a wall surface body having a first wall provided with a first through-hole, a second wall provided with a second through-hole, and a connecting wall connecting the first wall and the second wall, in which the tube body is inserted through the first through-hole and the second through-hole, and is joined to the wall surface body by being pressure welded to the first through-hole and the second through-hole, and the expanded tube portion is provided only between the first wall and the second wall.

According to this configuration, since the expanded tube portion is provided only between the first wall and the second wall, the expanded tube portion is disposed inside the wall surface body. Therefore, it is possible to prevent bending force and vibration from being applied only to the expanded tube portion, and to protect the expanded tube portion where the flexural rigidity and the vibration damping properties may deteriorate by the wall surface body. Thus, it is possible to improve the flexural rigidity and the vibration damping properties of the expanded tube portion, in a vehicle structural member.

The expanded tube portion may include a first expanded tube portion and a second expanded tube portion, the first expanded tube portion may be close to the first wall, and the second expanded tube portion may be close to the second wall.

According to this configuration, joint strength between the tube body and the wall surface body can be improved by providing a plurality of tube expansion portions. In particular, by bringing the first expanded tube portion close to the first wall and bringing the second expanded tube portion close to the second wall, it is possible to improve adhesion between the tube body and the wall surface body. Therefore, it is possible to further improve the flexural rigidity and the vibration damping properties of the expanded tube portion.

A second aspect of the present invention provides a method for manufacturing a vehicle structural member, the method including: preparing a tube body, a wall surface body having a first wall provided with a first through-hole, a second wall provided with a second through-hole, and a connecting wall connecting the first wall and the second wall, an elastic body insertable into the tube body, and a restricting member; inserting the elastic body into the tube body; inserting the tube body through the first through-hole and the second through-hole; placing the restricting member outside the first wall and the second wall so as to restrict deformation of the tube body; compressing the elastic body in a tube axis direction of the tube body to bulge radially outwardly, thereby expanding the tube body; and when expanding the tube body, forming an expanded tube portion only between the first wall and the second wall while preventing tube expansion outside the first wall and the second wall with the restricting member, and joining the tube body to the wall surface body by pressure welding the tube body to the first through-hole and the second through-hole.

According to this method, since the expanded tube portion is provided only between the first wall and the second wall, the expanded tube portion is protected by the wall surface body. Therefore, it is possible to improve the flexural rigidity and the vibration damping properties of the expanded tube portion. In particular, since the restricting member is used, the expanded tube portion can be accurately provided only between the first wall and the second wall.

A third aspect of the present invention provides a method for manufacturing a vehicle structural member, the method including: preparing a tube body, a wall surface body having a first wall provided with a first through-hole, a second wall provided with a second through-hole, and a connecting wall connecting the first wall and the second wall, and an elastic body insertable into the tube body; inserting the elastic body into the tube body; inserting the tube body through the first through-hole and the second through-hole; compressing the elastic body in a tube axis direction of the tube body to bulge radially outwardly, thereby expanding the tube body; and when expanding the tube body, placing the elastic body only between the first wall and the second wall, forming an expanded tube portion only between the first wall and the second wall, and joining the tube body to the wall surface body by pressure welding the tube body to the first through-hole and the second through-hole.

According to this method, since the expanded tube portion is provided only between the first wall and the second wall, the expanded tube portion is protected by the wall surface body. Therefore, it is possible to improve the flexural rigidity and the vibration damping properties of the expanded tube portion. In particular, since a position of the elastic body is defined, the expanded tube portion can be accurately provided only between the first wall and the second wall.

According to the present invention, in the vehicle structural member and the method for manufacturing the same, since the expanded tube portion is provided only between the first wall and the second wall, the expanded tube portion is protected by the wall surface body, and it is possible to improve the flexural rigidity and the vibration damping properties of the expanded tube portion.

MODE FOR CARRYING OUT THE INVENTION

Hereinafter, embodiments of the present invention will be described with reference to the accompanying drawings.

First Embodiment

Figure 1:
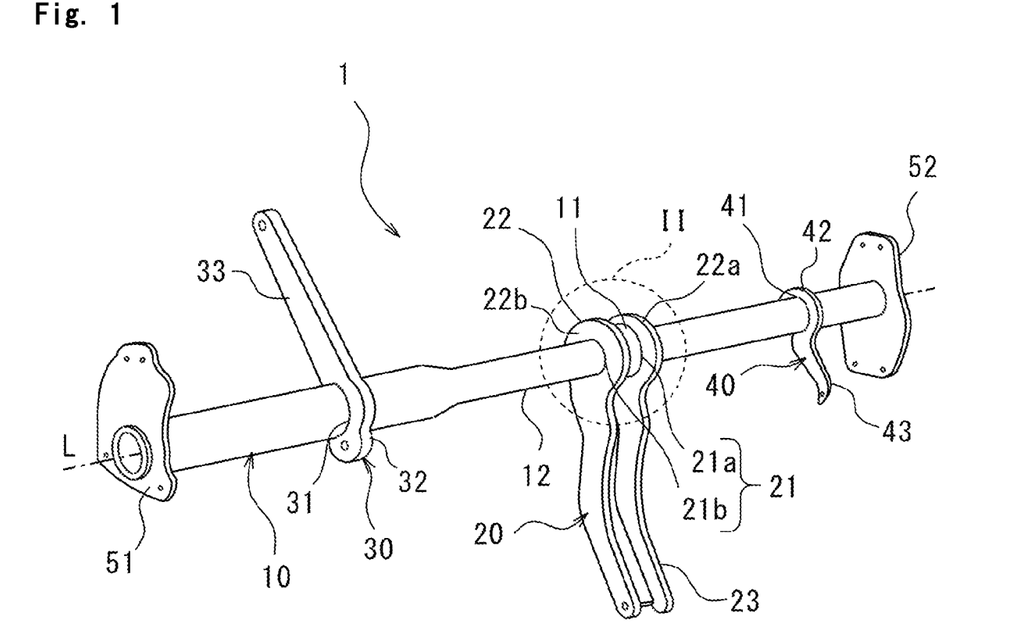
FIG. 1 is a perspective view of a vehicle structural member according to a first embodiment of the present invention.

FIG. 1 is a perspective view of a steering support 1 which is an example of a vehicle structural member.

The steering support 1 is a member for supporting steering of a vehicle. The steering support 1 is disposed to extend in a vehicle width direction in front of a vehicle compartment. The steering support 1 is configured such that a plurality of brackets 20, 30, and 40 are connected to a tube body 10.

The tube body 10 is a circular tubular member extending in a tube axis L direction. An internal space is defined inside the tube body 10. In the present embodiment, the tube body 10 is formed such that a driver seat side portion is relatively thick and a passenger seat side portion is relatively thin. Both ends of the tube body 10 are attached to body plates 51 and 52 which are parts of a vehicle body (not illustrated). Further, the tube body 10 is made of metal such as steel or aluminum alloy.

The brackets 20, 30, and 40 respectively have insertion portions 22, 32, and 42 provided with through-holes 21, 31, and 41 through which the tube body 10 is inserted, respectively, and extending portions 23, 33, and 43 extending from the insertion portions 22, 32, and 42. The brackets 20, 30, and 40 are joined to the tube body 10 at the insertion portions 22, 32, and 42. Specifically, by expanding the tube body 10 in the insertion portions 22, 32, and 42, an outer peripheral surface of the tube body 10 is pressure welded to edge portions of the through-holes 21, 31, and 41 of the brackets 20, 30, and 40. Further, the brackets 20, 30, and 40 are joined to other members at the extending portions 23, 33, and 43.

Figure 2:
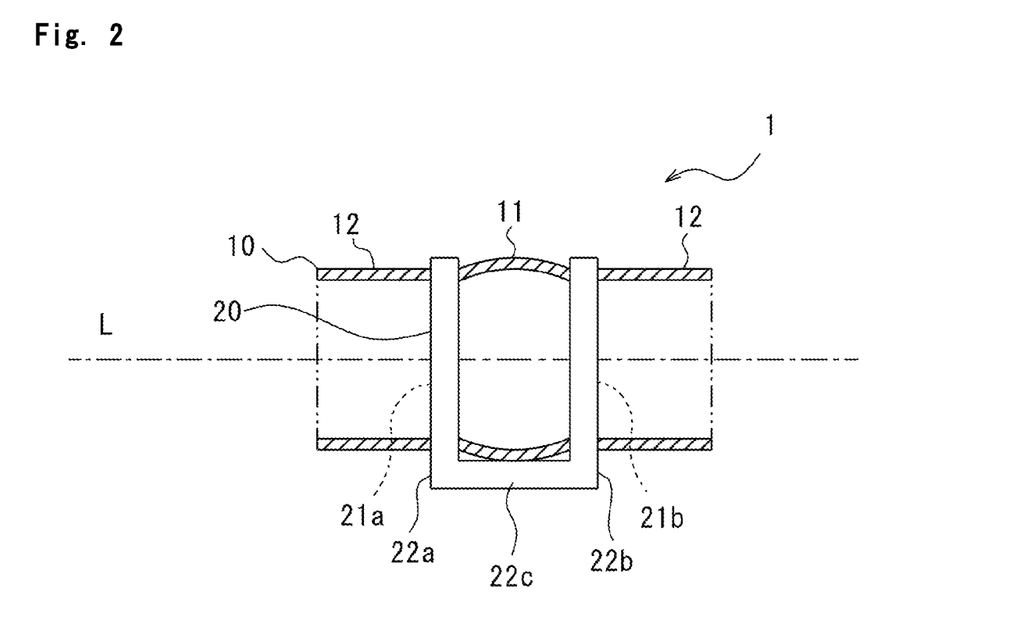
FIG. 2 is a cross-sectional view of a dashed circle II in FIG. 1.

FIG. 2 is a cross-sectional view of a portion of a dashed circle II in FIG. 1. In FIG. 2, only the tube body 10 is hatched and illustrated as a cross-section for clarity of illustration. Similarly in the following drawings, only some members may be hatched and illustrated as cross-sections. Further, hereinafter, the steering support 1 is referred to as a vehicle structural member 1, and the bracket 20 is referred to as a wall surface body 20.

In the vehicle structural member 1 of the present embodiment, the wall surface body 20 includes a first wall 22a provided with a first through-hole 21a (see also FIG. 1), a second wall 22b provided with a second through-hole 21b (see also FIG. 1), and a connecting wall 22c connecting the first wall 22a and the second wall 22b. The first wall 22a and the second wall 22b are arranged in parallel. The connecting wall 22c is disposed perpendicular to the first wall 22a and the second wall 22b. The first through-hole 21a and the second through-hole 21b have circular shapes of the same size when viewed from the tube axis L direction. The first through-hole 21a and the second through-hole 21b share the tube axis L as a central axis.

The tube body 10 includes an expanded tube portion 11 that is expanded, and a tubular portion 12 that is not subjected to tube expansion forming and maintains an original tubular shape. The tube body 10 is inserted through the first through-hole 21a and the second through-hole 21b, and is joined to the wall surface body 20 by being pressure welded to the first through-hole 21a and the second through-hole 21b by the expanded tube portion 11.

The expanded tube portion 11 is provided only between the first wall 22a and the second wall 22b. In other words, the expanded tube portion 11 is not provided outside the first wall 22a and the second wall 22b in the tube axis L direction. The expanded tube portion 11 is formed to have the largest diameter at a center between the first wall 22a and the second wall 22b in the tube axis L direction and to have a diameter reduced toward the first wall 22a and the second wall 22b. There is no unexpanded portion between the first wall 22a and the second wall 22b in the tube axis L direction, and the expanded tube portion 11 is formed over the entire region between the first wall 22a and the second wall 22b.

In the method for manufacturing the vehicle structural member 1 having the above configuration, the tube body 10 and the wall surface body 20 are joined by sequentially performing steps illustrated in FIGS. 3 to 7.

Figure 3:
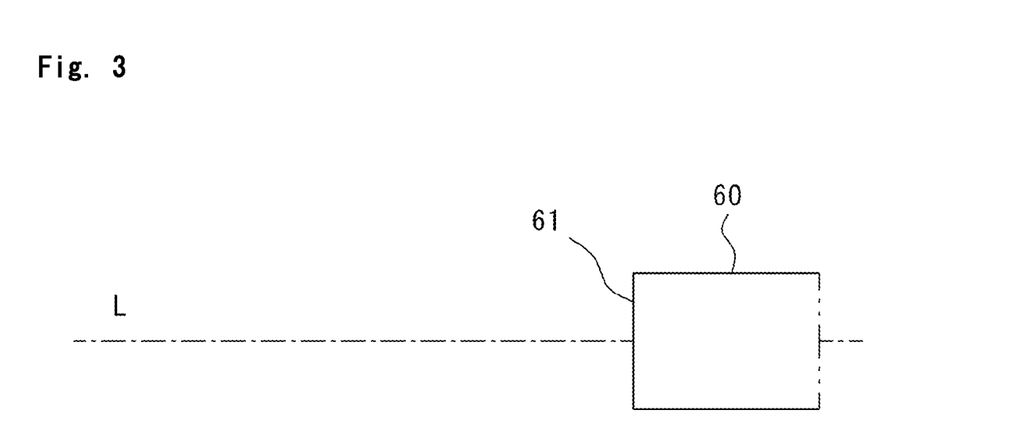
FIG. 3 is a first cross-sectional view illustrating a method for manufacturing the vehicle structural member according to the first embodiment.

Referring to FIG. 3, a fixing jig 60 whose position is fixed is prepared. The fixing jig 60 is set in, for example, a pressing machine (not illustrated) so as not to move. The fixing jig 60 has, for example, a columnar shape and has a flat surface 61 for receiving a pressing force to be described later. The flat surface 61 is a surface perpendicular to the tube axis L and flat.

Figure 4:
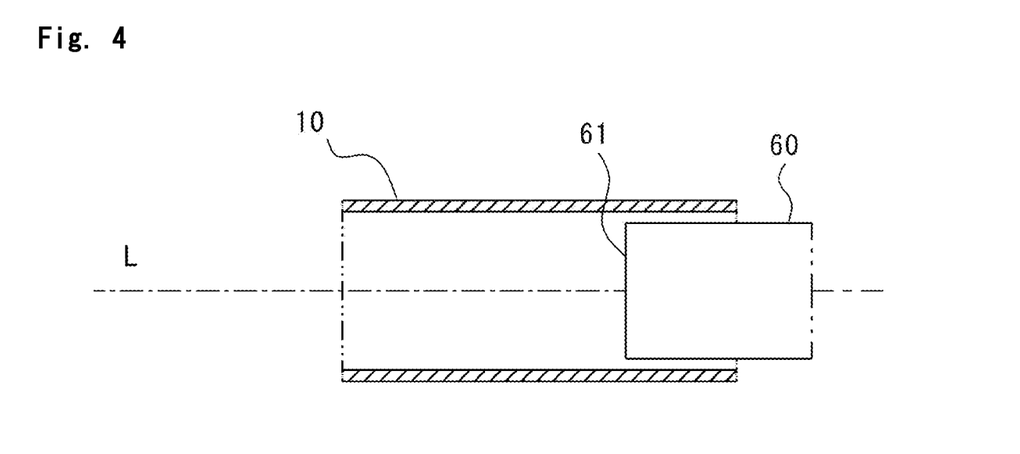
FIG. 4 is a second cross-sectional view illustrating the method for manufacturing the vehicle structural member according to the first embodiment.

Referring to FIG. 4, the tube body 10 is set to the fixing jig 60. In particular, the flat surface 61 is disposed to be aligned with a portion of the tube body 10 in which the expanded tube portion 11 is formed. At this time, the tube body 10 is not yet formed with the expanded tube portion 11 (see FIG. 2).

Figure 5:
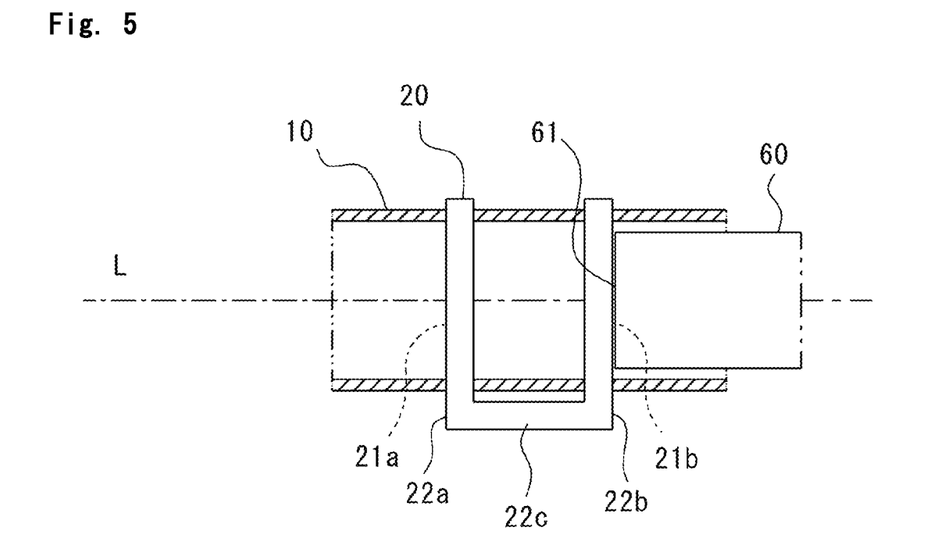
FIG. 5 is a third cross-sectional view illustrating the method for manufacturing the vehicle structural member according to the first embodiment.

Referring to FIG. 5, the wall surface body 20 is disposed such that the tube body 10 penetrates the first through-hole 21a and the second through-hole 21b. At this time, an end surface 20a of the wall surface body 20 and the flat surface 61 of the fixing jig 60 are aligned in the tube axis L direction.

Figure 6:
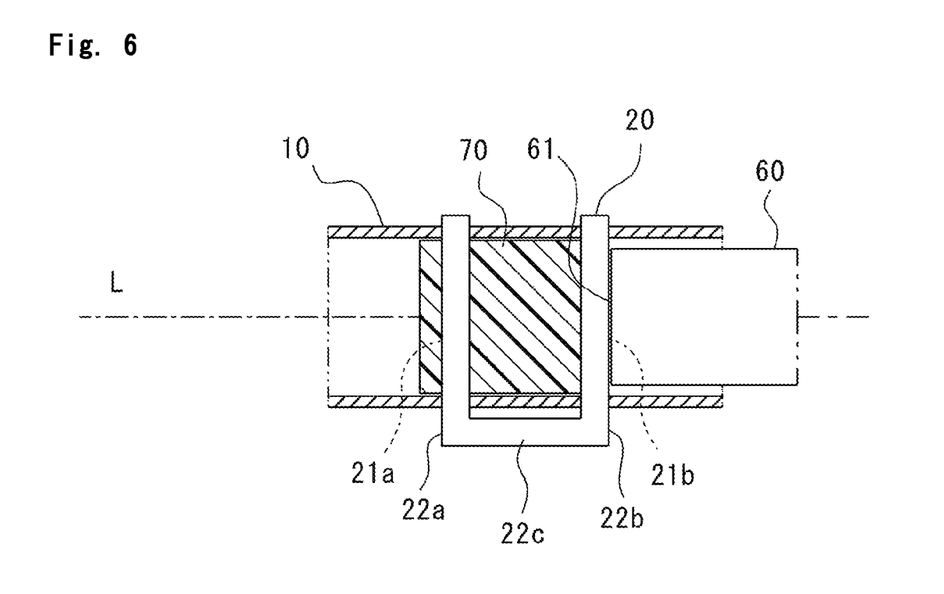
FIG. 6 is a fourth cross-sectional view illustrating the method for manufacturing the vehicle structural member according to the first embodiment.

Referring to FIG. 6, an elastic body 70 is disposed inside the tube body 10. The elastic body 70 has, for example, a columnar shape having a diameter slightly smaller than an inner diameter of the tube body 10. In the tube axis L direction, the elastic body 70 is slightly longer than a length of the wall surface body 20 in a natural state, but has a length that fits within the wall surface body 20 when compressed in the tube axis L direction as in FIG. 7 described later. That is, the elastic body 70 has a length shorter than an interval between the first wall 22a and the second wall 22b of the wall surface body 20 in a compressed state. The material of the elastic body 70 may be, for example, urethane rubber, chloroprene rubber, CNR rubber (chloroprene rubber and nitrile rubber), or silicone rubber. Preferably, hardness of the elastic body 70 is 30 or more in Shore A.

Figure 7:
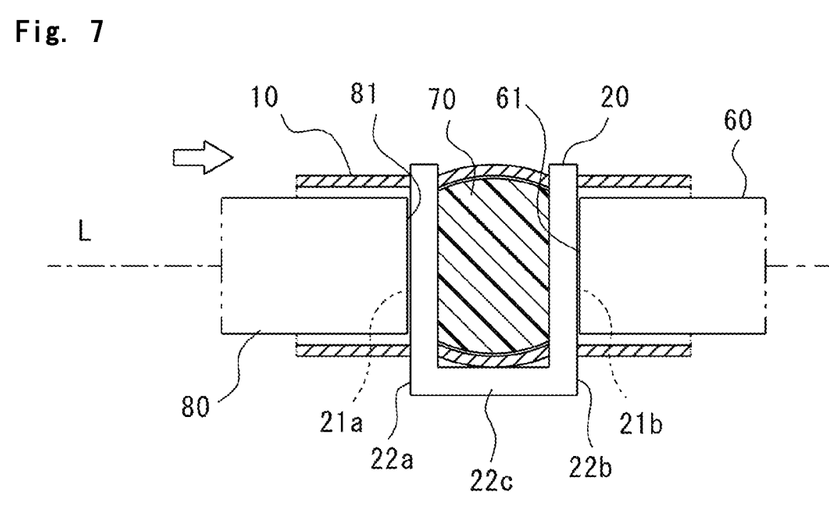
FIG. 7 is a fifth cross-sectional view illustrating the method for manufacturing the vehicle structural member according to the first embodiment.

Referring to FIG. 7, a moving jig 80 having a flat surface 81 for applying a pressing force to the elastic body 70 is prepared. The flat surface 81 is a surface perpendicular to the tube axis L and flat. Then, the moving jig 80 presses the elastic body 70 toward the fixing jig 60. That is, in the tube axis L direction, the elastic body 70 is pressed to be sandwiched between the flat surface 81 of the moving jig 80 and the flat surface 61 of the fixing jig 60. The pressing may be performed by the pressing machine. By the pressing, the elastic body 70 is compressed in the tube axis L direction and bulges radially outwardly. Thus, the tube body 10 is expansion-formed so that the expanded tube portion 11 is formed (see FIG. 2). In the tube expansion forming, the elastic body 70 is disposed only between the first wall 22a and the second wall 22b, and the expanded tube portion 11 is formed only between the first wall 22a and the second wall 22b. At the same time, the outer peripheral surface of the tube body 10 is pressure welded to edge portions of the first through-hole 21a and the second through-hole 21b, to be joined to the wall surface body 20. Such a forming method using the elastic body 70 is referred to as rubber bulge forming.

Referring again to FIG. 2, after completion of the tube expansion forming, the elastic body 70 (see FIG. 7) from which the pressing force has been released is restored to its original shape by its own elastic force, and thus can be easily removed. In this way, the vehicle structural member 1 is manufactured.

The method for manufacturing the vehicle structural member 1 is an example, and the present invention is not limited thereto. For example, the order of the steps in FIGS. 5 and 6 may be changed, and the steps in FIGS. 6 and 7 may be performed simultaneously.

According to the present embodiment, since the expanded tube portion 11 is provided only between the first wall 22a and the second wall 22b, the expanded tube portion 11 is disposed inside the wall surface body 20. Therefore, it is possible to prevent bending force and vibration from being applied only to the expanded tube portion 11, and to protect the expanded tube portion 11 where the flexural rigidity and the vibration damping properties may deteriorate by the wall surface body 20. Thus, it is possible to improve the flexural rigidity and the vibration damping properties of the expanded tube portion 11, in the vehicle structural member 1.

(Modification)

Figure 8:
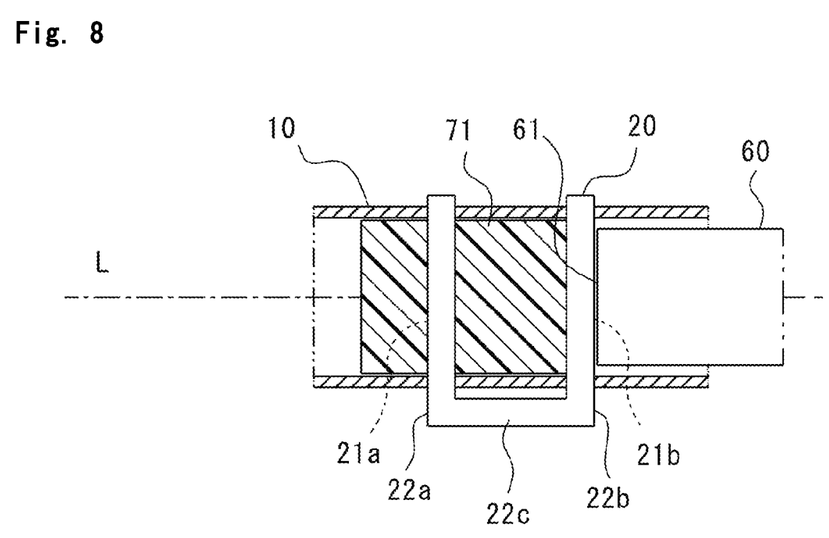
FIG. 8 is a first cross-sectional view illustrating the method for manufacturing the vehicle structural member according to a modification of the first embodiment.

A modification of the first embodiment will be described with reference to FIGS. 8 to 10.

The vehicle structural member 1 of the present modification is the same as that of the first embodiment (see FIG. 2), but the method for manufacturing the same is partially different.

In the present modification, the same steps of FIGS. 3 to 5 as in the above embodiment are performed.

Subsequently, referring to FIG. 8, an elastic body 71 is disposed inside the tube body 10. The elastic body 71 has, for example, a columnar shape having a diameter slightly smaller than the inner diameter of the tube body 10. In the tube axis L direction, the elastic body 71 is slightly longer than the length of the wall surface body 20 in a natural state, and has a length that does not fit within the wall surface body 20 even when compressed in the tube axis L direction as in FIG. 10 described later. That is, the elastic body 71 has a length longer than the interval between the first wall 22a and the second wall 22b of the wall surface body 20 even in a compressed state. The material of the elastic body 71 is the same as that of the above embodiment.

Figure 9:
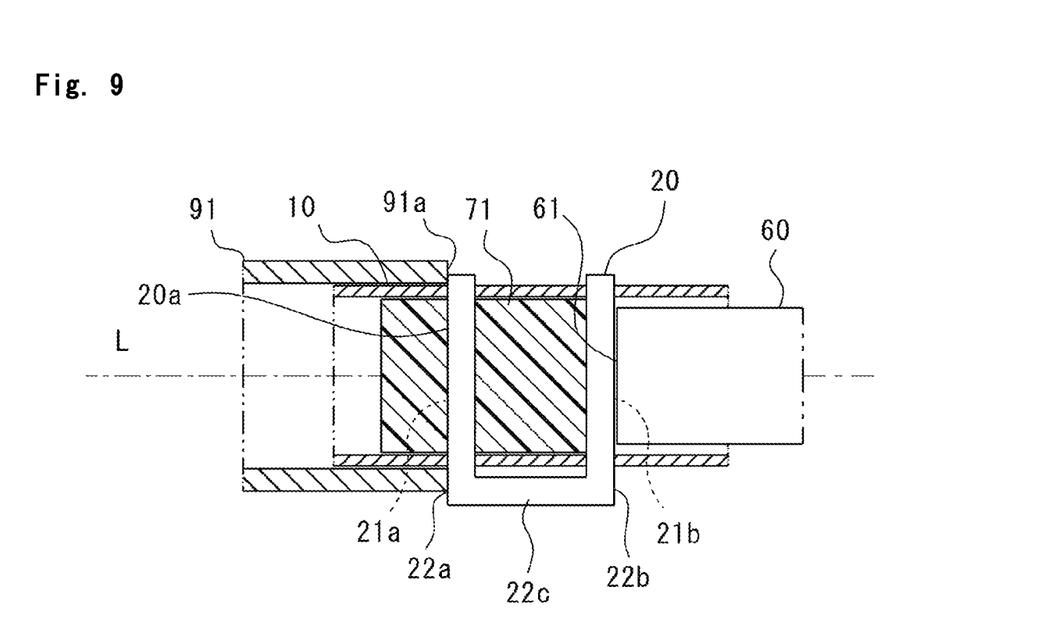
FIG. 9 is a second cross-sectional view illustrating the method for manufacturing the vehicle structural member according to the modification of the first embodiment.

Referring to FIG. 9, a restricting member 91 is disposed on a side opposite to the fixing jig 60 with respect to the wall surface body 20 in the tube axis L direction, and a part of the tube body 10 is inserted into the restricting member 91. The restricting member 91 has a circular tubular shape having an inner diameter substantially equal to an outer diameter of the tube body 10. At this time, an end surface 91a of the restricting member 91 and the end surface 20a of the wall surface body 20 are aligned in the tube axis L direction. In addition, the restricting member 91 has rigidity that does not deform even when the tube expansion forming illustrated in FIG. 10 described later is performed.

Figure 10:
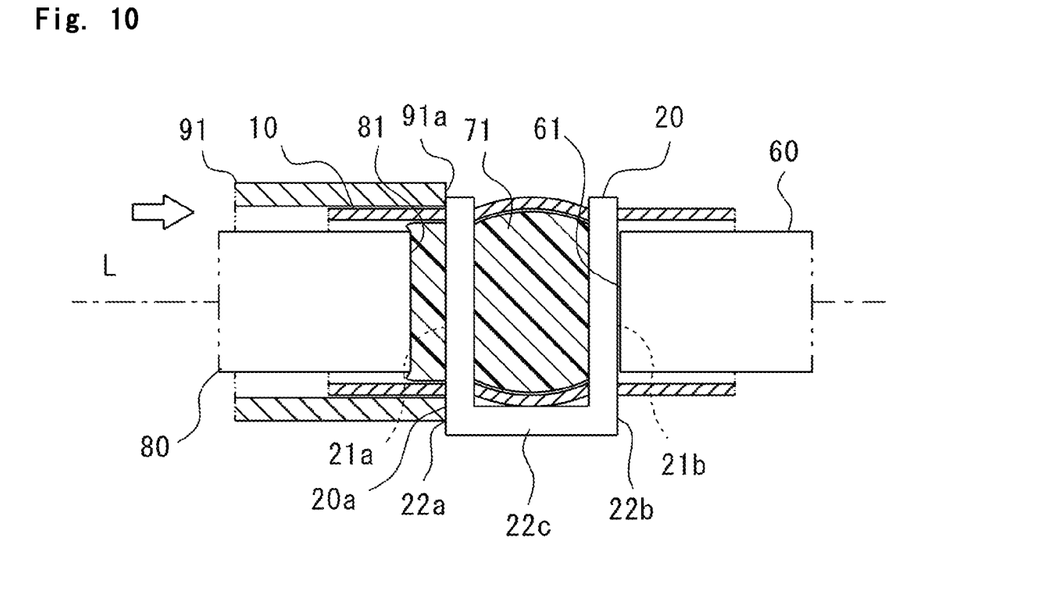
FIG. 10 is a third cross-sectional view illustrating the method for manufacturing the vehicle structural member according to the modification.

Referring to FIG. 10, the moving jig 80 having the flat surface 81 for applying the pressing force to the elastic body 71 is prepared. The flat surface 81 is a surface perpendicular to the tube axis L and flat. Then, the moving jig 80 presses the elastic body 71 toward the fixing jig 60. That is, in the tube axis L direction, the elastic body 71 is pressed to be sandwiched between the flat surface 81 of the moving jig 80 and the flat surface 61 of the fixing jig 60. The pressing may be performed by the pressing machine. By the pressing, the elastic body 71 is compressed in the tube axis L direction and bulges radially outwardly. At this time, the elastic body 71 does not fit within the wall surface body 20 even when compressed in the tube axis L direction. Therefore, a tube expanding force acts on the tube body 10 from the elastic body 71 outside the wall surface body 20 (on the left side of the first wall 22a in FIG. 10). However, since the restricting member 91 is disposed around a portion where the tube expanding force acts, the tube body 10 is not expanded outside the wall surface body 20 (on the left side of the first wall 22a in FIG. 10). Therefore, by the tube expansion forming, the expanded tube portion 11 (see FIG. 2) is formed only between the first wall 22a and the second wall 22b while preventing tube expansion outside the first wall 22a and the second wall 22b. At the same time, the outer peripheral surface of the tube body 10 is pressure welded to edge portions of the first through-hole 21a and the second through-hole 21b, to be joined to the wall surface body 20.

Referring again to FIG. 2, after completion of the tube expansion forming, the elastic body 71 (see FIG. 10) from which the pressing force has been released is restored to its original shape by its own elastic force, and thus can be easily removed. In addition, the vehicle structural member 1 is manufactured by removing the restricting member 91 as well. Note that the restricting member 91 may be configured such that the tubular shape of the restricting member 91 can be opened for easy removal.

According to the present modification, since the expanded tube portion 11 is provided only between the first wall 22a and the second wall 22b, the expanded tube portion 11 is protected by the wall surface body 20. Therefore, it is possible to improve the flexural rigidity and the vibration damping properties of the expanded tube portion 11. In particular, since the restricting member 91 is used, the expanded tube portion 11 can be accurately provided only between the first wall 22a and the second wall 22b.

Second Embodiment

Figure 11:
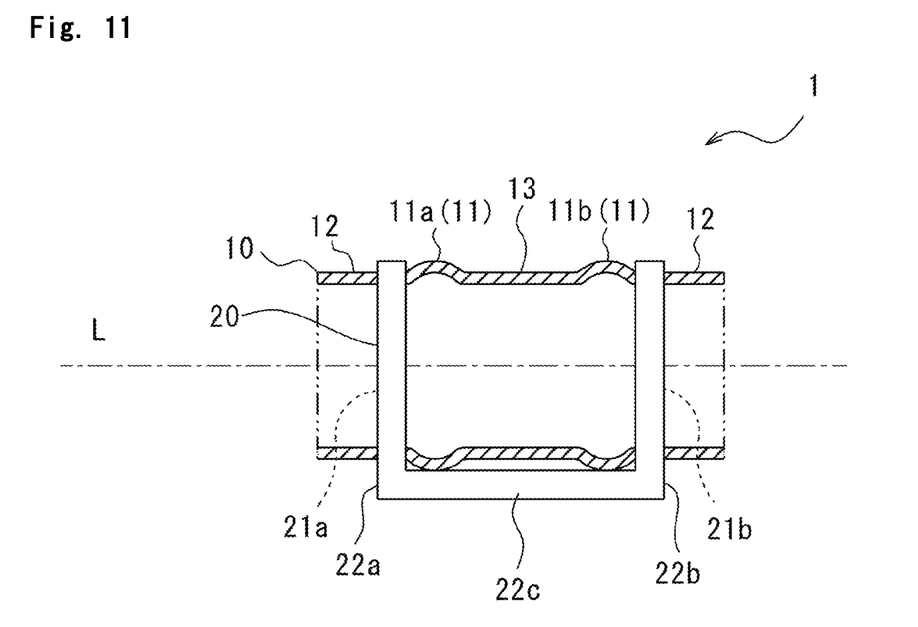
FIG. 11 is a cross-sectional view illustrating the vehicle structural member according to a second embodiment.

The vehicle structural member 1 of a second embodiment illustrated in FIG. 11 is different from that of the first embodiment in the shape of the expanded tube portion 11. Except for a configuration related thereto, the vehicle structural member 1 is substantially the same as the vehicle structural member 1 of the first embodiment. Therefore, description of the same portions as those described in the first embodiment may be omitted.

In the vehicle structural member 1 of the present embodiment, the tube body 10 is expanded at two locations. That is, the expanded tube portion 11 includes a first expanded tube portion 11a and a second expanded tube portion 11b. The first expanded tube portion 11a is close to the first wall 22a. The second expanded tube portion 11b is close to the second wall 22b. A tubular portion 13 that is not expanded is provided between the first expanded tube portion 11a and the second expanded tube portion 11b.

Figure 12:
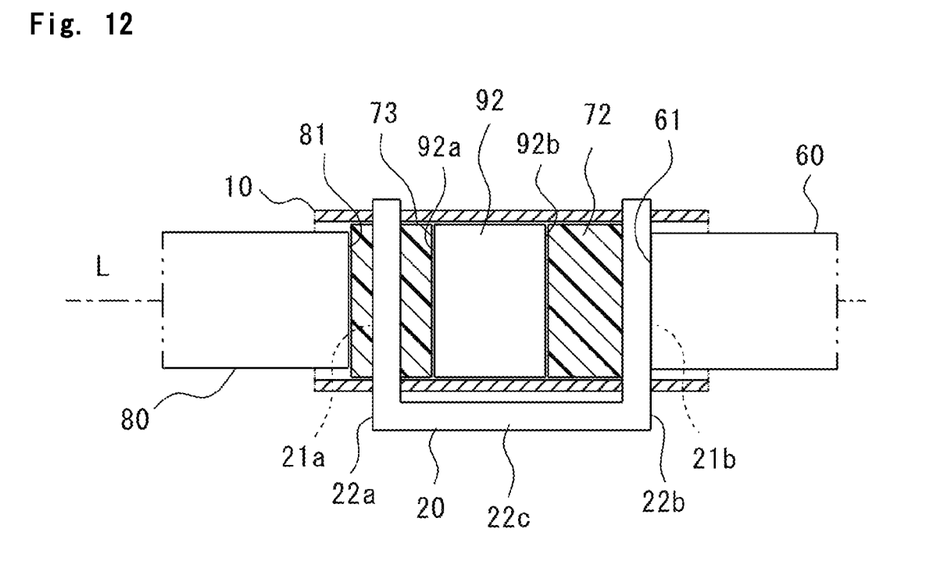
FIG. 12 is a first cross-sectional view illustrating the method for manufacturing the vehicle structural member according to the second embodiment.
Figure 13:
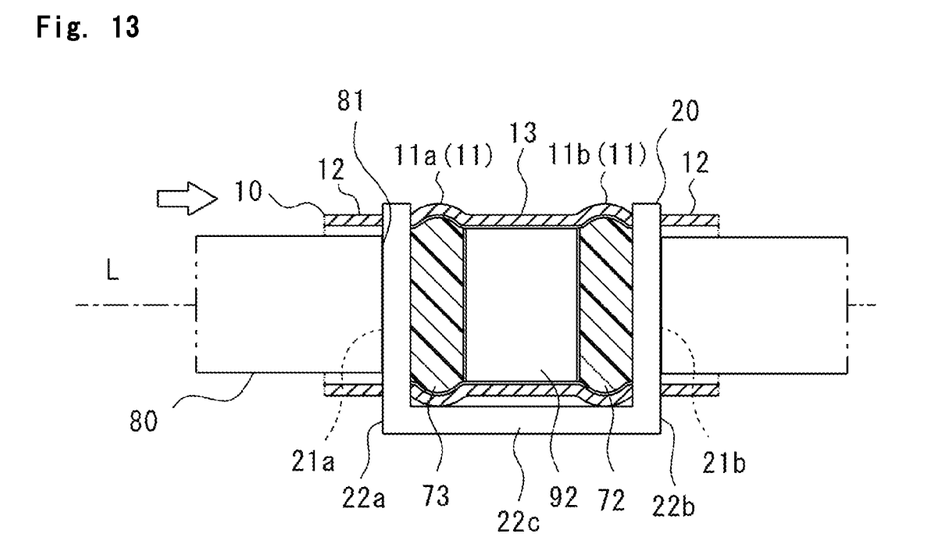
FIG. 13 is a second cross-sectional view illustrating the method for manufacturing the vehicle structural member according to the second embodiment.

In the method for manufacturing the vehicle structural member 1 having the above configuration, the tube body 10 and the wall surface body 20 are joined by sequentially performing the steps in FIGS. 3 to 5 and steps in FIGS. 12 and 13.

In the present embodiment, the same steps of FIGS. 3 to 5 as in the first embodiment are performed.

Subsequently, referring to FIG. 12, an elastic body 72, a core 92, and an elastic body 73 are inserted into the tube body 10 in this order. The core 92 has, for example, a columnar shape having a diameter slightly smaller than the inner diameter of the tube body 10. The core 92 has flat surfaces 92a and 92b perpendicular to the tube axis L. In the tube axis L direction, the core 92 is shorter than the interval between the first wall 22a and the second wall 22b, and has substantially the same length as a central tubular portion 13 (see FIG. 11). The two elastic bodies 72 and 73 have the same shape, for example, a columnar shape having a diameter slightly smaller than the inner diameter of the tube body 10. The total length of the elastic bodies 72 and 73 and the core 92 in the tube axis L direction is slightly longer than the length of the wall surface body 20 in a natural state, but is a length that fits within the wall surface body 20 when the elastic bodies 72 and 73 are compressed in the tube axis L direction as in FIG. 13 described later. That is, the elastic bodies 72 and 73 and the core 92 have a length shorter than the interval between the first wall 22a and the second wall 22b of the wall surface body 20 in a compressed state. The material of the elastic bodies 72 and 73 is the same as that of the first embodiment.

Referring to FIG. 13, the moving jig 80 having the flat surface 81 for applying the pressing force to the elastic bodies 72 and 73 is prepared. The flat surface 81 is a surface perpendicular to the tube axis L and flat. Then, the moving jig 80 presses the elastic bodies 72 and 73 toward the fixing jig 60. That is, in the tube axis L direction, the elastic body 73 is pressed to be sandwiched between the flat surface 81 of the moving jig 80 and the flat surface 92a of the core 92, and the elastic body 72 is pressed to be sandwiched between the flat surface 92b of the core 92 and the flat surface 61 of the fixing jig 60. The pressing may be performed by the pressing machine. By the pressing, the elastic bodies 72 and 73 are compressed in the tube axis L direction and bulge radially outwardly. Thus, the tube body 10 is expansion-formed, so that the first expanded tube portion 11a and the second expanded tube portion 11b are formed. In the tube expansion forming, the elastic bodies 72 and 73 are arranged only between the first wall 22a and the second wall 22b and in the vicinity of the first wall 22a and the second wall 22b, and the expanded tube portion 11 is formed only between the first wall 22a and the second wall 22b and in the vicinity of the first wall 22a and the second wall 22b. At the same time, the outer peripheral surface of the tube body 10 is pressure welded to edge portions of the first through-hole 21a and the second through-hole 21b, to be joined to the wall surface body 20.

Referring again to FIG. 11, after completion of the tube expansion forming, the elastic bodies 72 and 73 from which the pressing force has been released are restored to their original shape by their own elastic force, and thus can be easily removed. Further, the core 92 is also removed. In this way, the vehicle structural member 1 is manufactured.

According to the present embodiment, joint strength between the tube body 10 and the wall surface body 20 can be improved by providing a plurality of tube expansion portions. In particular, by bringing the first expanded tube portion 11a close to the first wall 22a and bringing the second expanded tube portion 11b close to the second wall 22b, it is possible to improve adhesion between the tube body 10 and the wall surface body 20. Therefore, it is possible to further improve the flexural rigidity and the vibration damping properties of the expanded tube portion 11.

(Modification)

Figure 14:
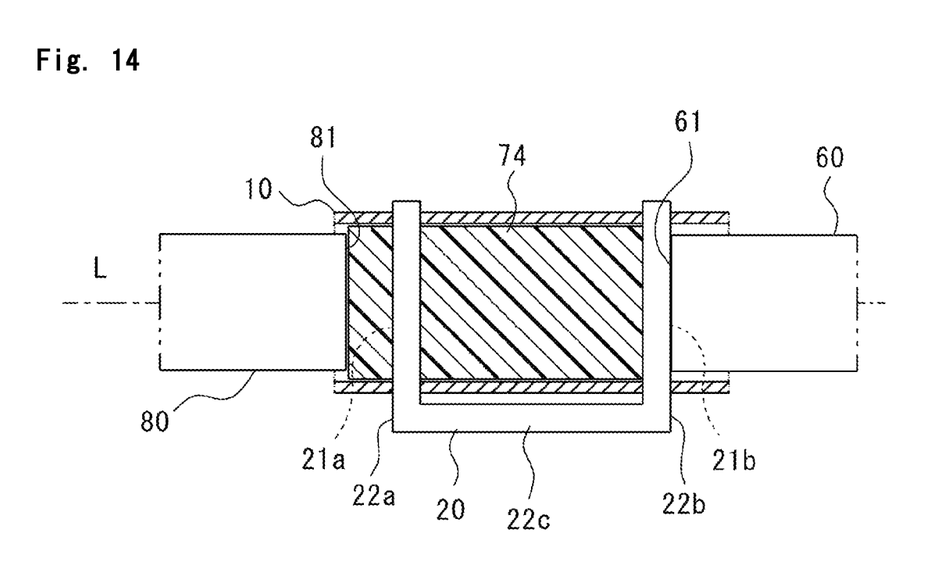
FIG. 14 is a first cross-sectional view illustrating the method for manufacturing the vehicle structural member according to a modification of the second embodiment.

A modification of the second embodiment will be described with reference to FIGS. 14 and 15.

In the present modification, the vehicle structural member 1 is the same as that of the second embodiment (see FIG. 11), but the method for manufacturing the same is partially different.

In the present modification, the same steps of FIGS. 3 to 5 as in the first embodiment are performed.

Subsequently, referring to FIG. 14, an elastic body 74 is disposed inside the tube body 10. The elastic body 74 has, for example, a columnar shape having a diameter slightly smaller than the inner diameter of the tube body 10. In the tube axis L direction, the elastic body 74 is longer than the length of the wall surface body 20 in a natural state, and has a length that does not fit within the wall surface body 20 even when compressed in the tube axis L direction as in FIG. 16 described later. That is, the elastic body 74 has a length longer than the interval between the first wall 22a and the second wall 22b of the wall surface body 20 even in a compressed state. The material of the elastic body 74 is the same as that of the first embodiment.

Figure 15:
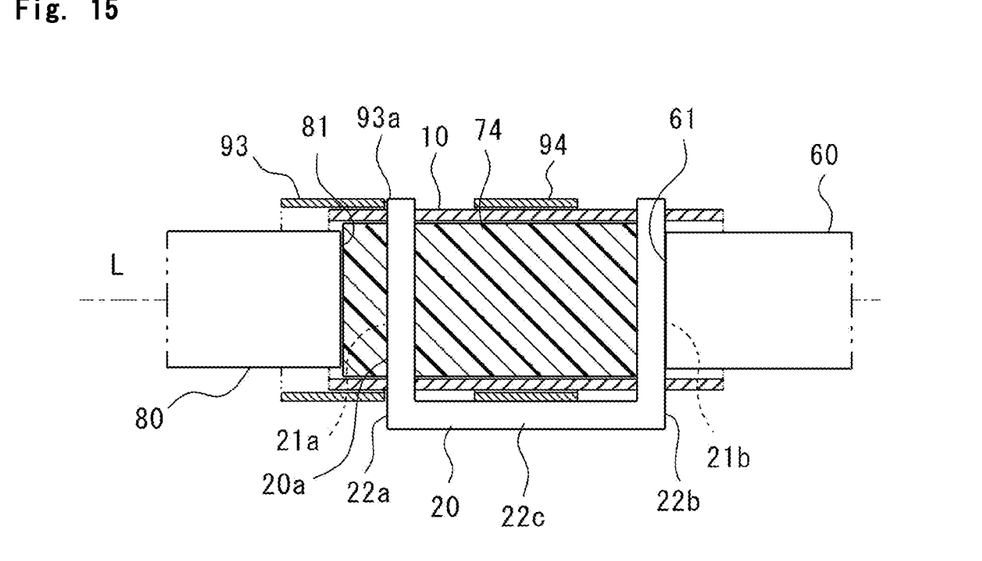
FIG. 15 is a second cross-sectional view illustrating the method for manufacturing the vehicle structural member according to the modification of the second embodiment.

Referring to FIG. 15, a restricting member 93 is disposed on the side opposite to the fixing jig 60 with respect to the wall surface body 20 in the tube axis L direction, and a part of the tube body 10 is inserted into the restricting member 93. In addition, a restricting member 94 is disposed at a central portion between the first wall 22a and the second wall 22b in the tube axis L direction, and the tube body 10 is inserted through the restricting member 94. The restricting members 93 and 94 each have a circular tubular shape having an inner diameter substantially equal to the outer diameter of the tube body 10. At this time, an end surface 93a of the restricting member 93 and the end surface 20a of the wall surface body 20 are aligned in the tube axis L direction. In addition, the restricting members 93 and 94 each have rigidity that does not deform even when the tube expansion forming illustrated in FIG. 16 described later is performed.

Figure 16:
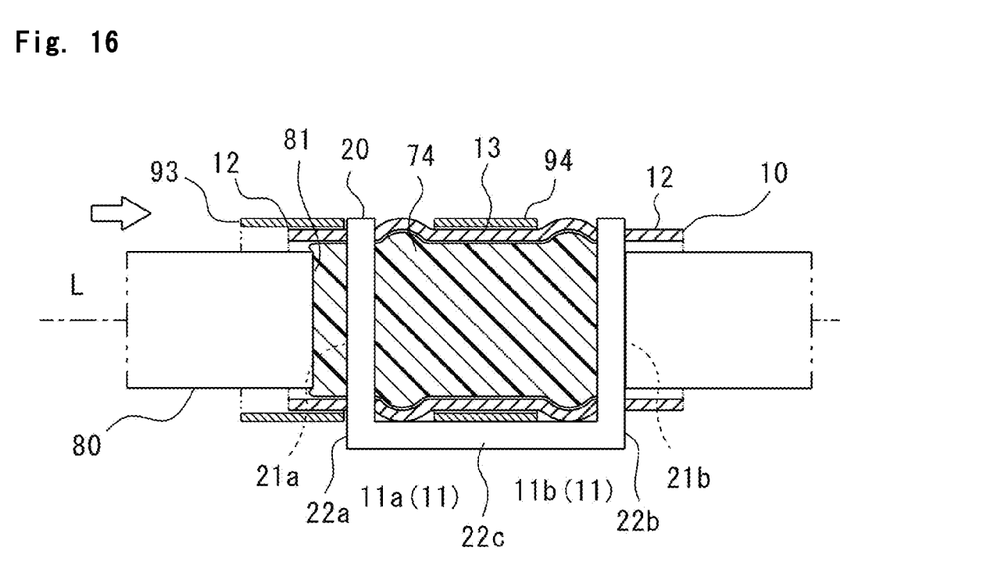
FIG. 16 is a third cross-sectional view illustrating the method for manufacturing the vehicle structural member according to the modification of the second embodiment.

Referring to FIG. 16, the moving jig 80 having the flat surface 81 for applying the pressing force to the elastic body 74 is prepared. The flat surface 81 is a surface perpendicular to the tube axis L and flat. Then, the moving jig 80 presses the elastic body 74 toward the fixing jig 60. That is, in the tube axis L direction, the elastic body 74 is pressed to be sandwiched between the flat surface 81 of the moving jig 80 and the flat surface 61 of the fixing jig 60. The pressing may be performed by the pressing machine. By the pressing, the elastic body 74 is compressed in the tube axis L direction and bulges radially outwardly. At this time, the elastic body 74 does not fit within the wall surface body 20 even when compressed in the tube axis L direction. Therefore, the tube expanding force acts on the tube body 10 from the elastic body 74 outside the wall surface body 20 (on the left side of the first wall 22a in FIG. 16). However, since the restricting member 93 is disposed around the portion where the tube expanding force acts, the tube body 10 is not expanded outside the wall surface body 20 (on the left side of the first wall 22a in FIG. 10). In addition, since the restricting member 94 is also disposed at the central portion between the first wall 22a and the second wall 22b, the tube body 10 is not expanded also at the central portion between the first wall 22a and the second wall 22b. Therefore, the tube body 10 is expansion-formed, so that the first expanded tube portion 11a and the second expanded tube portion 11b are formed. At the same time, the outer peripheral surface of the tube body 10 is pressure welded to edge portions of the first through-hole 21a and the second through-hole 21b, to be joined to the wall surface body 20.

Referring again to FIG. 11, after completion of the tube expansion forming, the elastic body 74 from which the pressing force has been released is restored to its original shape by its own elastic force, and thus can be easily removed. In addition, the vehicle structural member 1 is manufactured by removing the restricting members 93 and 94 as well. Note that the restricting members 93 and 94 may be configured such that the tubular shape can be opened for easy removal. Thus, the restricting members 93 and 94 can be easily removed.

According to the present modification, since the first expanded tube portion 11a and the second expanded tube portion 11b are provided only between the first wall 22a and the second wall 22b, the first expanded tube portion 11a and the second expanded tube portion 11b are protected by the wall surface body. Therefore, it is possible to improve the flexural rigidity and the vibration damping properties of the first expanded tube portion 11a and the second expanded tube portion 11b. In particular, since the restricting members 93 and 94 are used, the first expanded tube portion 11a and the second expanded tube portion 11b can be accurately provided only between the first wall 22a and the second wall 22b.

Although specific embodiments of the present invention and modifications thereof have been described above, the present invention is not limited to the above embodiments, and can be implemented with various modifications within the scope of the present invention. For example, an appropriate combination of the contents of the individual embodiments may be an embodiment of the present invention. Although the rubber bulge forming is exemplified as a tube expanding method, tube expansion forming can be alternatively performed by any forming method such as electromagnetic forming, flex forming, and mechanical forming such as a mandrel.

The invention claimed is:

1. A method for manufacturing a vehicle structural member, the method comprising:
   preparing a tube body, a wall surface body having a first wall provided with a first through-hole, a second wall provided with a second through-hole, and a connecting wall connecting the first wall and the second wall, an elastic body insertable into the tube body, and a restricting member having an end surface;
   inserting the elastic body into the tube body;
   inserting the tube body through the first through-hole and the second through-hole;
   placing the restricting member such that the end surface of the restricting member is aligned with an end surface of the wall surface body in a tube axis direction outside the first wall and the second wall so as to restrict deformation of the tube body;
   compressing the elastic body in the tube axis direction of the tube body to bulge radially outwardly, thereby expanding the tube body; and
   when expanding the tube body, forming an expanded tube portion only between the first wall and the second wall while preventing tube expansion outside the first wall and the second wall with the restricting member, and joining the tube body to the wall surface body by pressure welding the tube body to the first through-hole and the second through-hole.

2. A method for manufacturing a vehicle structural member, the method comprising:
   preparing a tube body, a wall surface body having a first wall provided with a first through-hole, a second wall provided with a second through-hole, and a connecting wall connecting the first wall and the second wall, and an elastic body and a core which are insertable into the tube body, the elastic body having first and second elastic body portions;
   inserting the elastic body and the core into the tube body in the order of the first elastic body portion, the core, and the second elastic body portion in a tube axis direction;
   inserting the tube body through the first through-hole and the second through-hole;

compressing the elastic body in the tube axis direction of the tube body to bulge radially outwardly, thereby expanding the tube body; and when expanding the tube body, placing the elastic body only between the first wall and the second wall, forming first and second expanded tube portions and a tubular portion between the first and second expanded portions only between the first wall and the second wall, and joining the tube body to the wall surface body by pressure welding the tube body to the first through-hole and the second through-hole.

3. The method for manufacturing the vehicle structural member according to claim 1, further comprising:

preparing another restricting member;

placing the another restricting member such that a tubular portion of the tube body is inserted into the another restricting member at a central portion between the first wall and the second wall in the tube axis direction so as to restrict deformation of the tubular portion of the tube body, wherein when expanding the tube body, a first expanded tube portion and a second expanded tube portion with the tubular portion therebetween are formed as the expanded tube portion.

* * * * *